Nov. 9, 1937.    J. J. KLEINSMITH    2,098,583
VALVE
Filed March 17, 1937
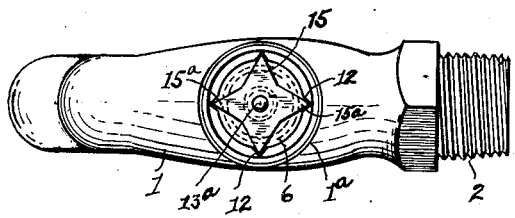
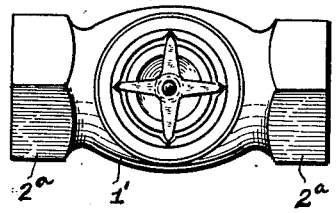
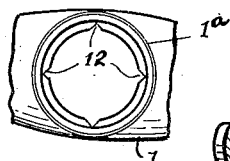
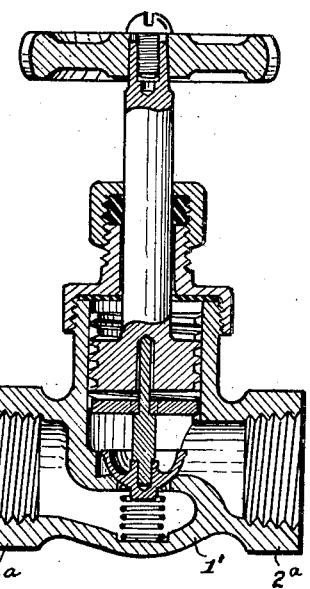
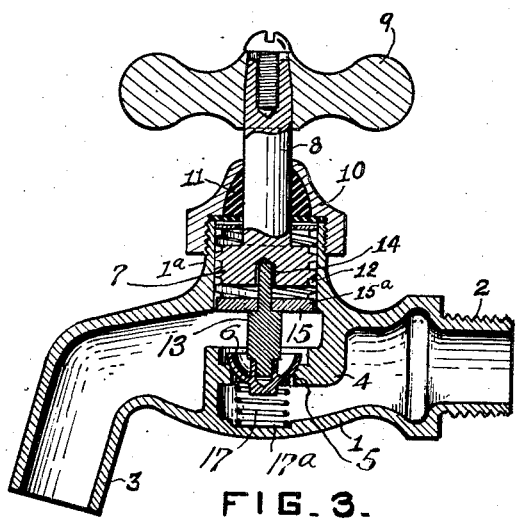
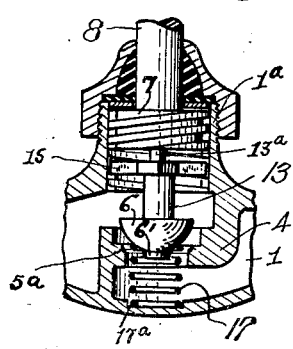
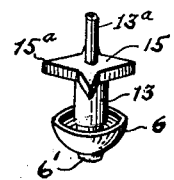
INVENTOR.
JOHN J. KLEINSMITH.
BY Geo. B. Titus
ATTORNEY.

Patented Nov. 9, 1937

2,098,583

UNITED STATES PATENT OFFICE 2,098,583

VALVE

John J. Kleinsmith, Cleveland, Ohio

Application March 17, 1937, Serial No. 131,349

1 Claim. (Cl. 251—139)

This invention relates to a valve or a faucet.

One object of the invention is to provide an improved valve wherein the valve seat and valve element are formed of metal to insure a substantially permanent, non-leakable valve and to eliminate parts, such as washers and soft metal walls or seats which easily wear and require replacement to avoid leakage.

Another object of the invention is to provide an improved valve wherein the valve element is maintained in non-rotative relation to its seat when operated toward and from the seat, so that wear on either the seat or element is reduced to a minimum to insure both liquid tightness and durability.

Another object of the invention is to provide an improved valve having spherical shaped valve closing surfaces and means for applying pressure to close the valve at the center of the valve element axially of its seat to effect uniform engagement with the latter.

Another object of the invention is to provide a valve having a metal seat and a metal valve element of simple construction.

Other objects of the invention will be apparent to those skilled in the art to which my invention relates from the following description taken in connection with the accompanying drawing, wherein—

Fig. 1 is a sectional view through a valve or faucet, embodying my invention.

Fig. 2 is a plan view of the faucet, with parts removed.

Fig. 3 is a fragmentary view, showing the valve element unseated.

Fig. 4 is a detail view.

Fig. 4a is a top plan view of the valve body of Fig. 1.

Fig. 5 is a view similar to Fig. 1 but showing a modified form of construction.

Fig. 6 is a plan view of the form of construction shown in Fig. 5, parts being removed.

Referring to Figs. 1, 2, 3, and 4a, 1 indicates as an entirety the body of the valve shown in the form of a faucet having at one end a threaded nipple 2 for connection to a pipe in a well known manner and a discharge nozzle 3. Interiorly of the body 1 is a transverse wall 4 formed with an opening 5, the upper edge of which is ground to form a spherically shaped seat 5a for a spherically shaped valve element 6. The body 1 is shaped to provide an integral collar 1a in concentric relation to the seat 5a, the inner wall of the collar being threaded to receive the body portion 7 having a shank 8, which portion is correspondingly threaded, so that when the shank 8 is rotated, as by means of a suitable handle 9, the body portion 7 is moved axially of the collar. The outer wall of the collar 1a is threaded to take a cap 10, which surrounds the shank 8 and closes the upper end of the collar 1a and accommodates a packing 11, as is customary in valves such as herein illustrated. The inner wall of the collar 1a is formed with a plurality of longitudinally extending grooves 12 (preferably four) uniformly spaced around the collar and having a length equal to the maximum axial movement of the body portion in seating and unseating the valve element 6. By preference, the grooves 12 extend from end to end of the collar 1a and form guides for a purpose later set forth, being cut through the threads on the inner wall of the collar 1a.

The valve element 6 has fixed to it a stem 13, the upper end of which extends into and loosely and slidably fits an elongated opening or hole 14 formed in and extending axially of the body portion 7, the outer or free end of the stem 13 being rounded to provide a pivotal bearing for the stem 13 with the bottom wall of the opening 14, the engagement of the free end of the stem 13 with the end wall of the hole serving as the connection between the stem and the body portion 7 to seat the valve 6 when the body portion 7 is moved axially toward the seat 5a upon the turning of the handle 9 in the proper direction. The hole 14 is enlarged with respect to that portion of the valve item 13 which extends thereinto, so that the valve element 6 is free to uniformly engage the seat 5a when it is forced toward the valve seat by the body portion 7 irrespective of any lateral movement of the latter due to looseness between the body portion and collar 1a.

15 indicates a plate fixed to the valve stem 13 and having on its periphery projections 15a, which slidably fit the guides 12. The guides 12 are preferably V-shape in cross section and the projections 15a are correspondingly shaped. As the stem 13 is supported by the plate 15 axially of the valve seat in position to extend into the opening 14, the body portion 7 may be assembled in the collar 1a and removed and replaced in a ready manner as there is no mechanical connection between such portion and the stem 13. The inner end of the stem 13 is secured to the valve element 6 in any desired manner, such end being preferably reduced and sweated into an up-standing axially disposed collar 16 on the inner wall of the valve element 6. The outer end of the stem 13 is also reduced, as shown at 13a, to form a shoulder on which the plate 15 rests, the reduced end of the stem 13 extending through an opening in the plate and fixed to the walls thereof in any desired manner, as by a sweating-on process. The end portion 13a of the stem 13 is long enough to insure a space between the body portion 7 and plate 15, even when the body portion is moved toward the valve seat with the valve element 6 seated in final valve closing position. In this arrangement, the body portion 7 cannot make contact with the plate and effect lateral pressure on the stem and valve element and it permits all of the force or pressure to close the valve to be transmitted axially thereof.

When the handle 9 is turned to move the body portion 7 away from the valve seat, the valve element 6 and its stem 13 are free to move in the same direction, due to pressure of the liquid on the inlet side of the valve element, to unseat the latter, and in such movement and movement of these parts to close the valve element when the handle is turned to move the body portion in the valve closing direction, they are guided by the engagement of the projections 15a on the plate 15 with the walls of the groove 12. As the valve element 6 is held against rotation during these movements, its angular relation to the seat in successive re-seatings is not changed and hence no relative rotative grinding action takes place between the valve element and its seat to cause wear thereon.

I preferably interpose between the valve element 6 and bottom of the body 1 an expansion spring 17 which normally tends to unseat the valve element. The outer side of the valve element 6 is provided with a boss 6' which extends into the spring to form a seat for the adjacent end thereof and the bottom wall of the body 1 is formed with a recess 17a to form a seat for the lower end of the spring. Accordingly, the spring 17 is operatively connected with the valve element to cooperate with the plate 15 and walls of the opening 14 to support the valve element while moving axially of its seat. When the body portion 7 is moved away from the valve seat, the spring 17 serves (a) to supplement the fluid pressure in unseating the valve element and (b) unseat the valve element when fluid pressure does not exist in the body 1 and the body portion 7 is removed; and when the body portion 7 is removed, the stem 13 being moved outwardly, it can be easily grasped to remove the valve element.

The valve element and valve seat are formed of metal and their engaging surfaces are suitably ground to provide a liquid tight relation when engaged. By preference, the valve element is formed of stainless steel.

Fig. 4 shows a different form of valve, the body 1' of which is provided at its opposite ends with threaded collars 2a which are arranged to be connected in a pipe not shown and serve as a cut-off.

It will be noted from the foregoing description that while the valve stem 13 and body portion 7 are not connected for movement with the latter outwardly, in fact, these parts are detachably related, they are operatively connected so that movement of the body portion inwardly serves to seat the valve; and as the valve stem and valve element are movably supported independently of the body portion in operative relation to the opening 14 in the latter, the body portion may be readily removed and replaced. It will also be noted that the valve element may be readily re-ground.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

A valve construction comprising a body provided with a transverse wall formed with an opening to provide a valve seat and a collar in concentric relation to said seat, the inner wall of said collar being provided with screw threads and formed with a plurality of longitudinally extending grooves, a valve element arranged to engage said seat and provided with a stem extending into said collar, means for operating said valve element in a direction to seat it, said means including a body portion having screw threaded engagement with the screw threads in said collar and formed axially of said seat with an elongated opening into which said stem slidably fits, the bottom of said elongated opening being arranged to engage the free end of said stem and forming a removable pivotal connection therewith to move the valve element into engagement with said seat, and a device fixed to said stem and slidably engaging the grooves in said collar for preventing rotation of said valve element.

JOHN J. KLEINSMITH.